United States Patent

[11] 3,618,063

[72] Inventor Robert F. Johnson
Victor, N.Y.
[21] Appl. No. 10,360
[22] Filed Feb. 11, 1970
[45] Patented Nov. 2, 1971
[73] Assignee Eastman Kodak Company
Rochester, N.Y.

[54] DEFECT INSPECTION APPARATUS
8 Claims, 4 Drawing Figs.

[52] U.S. Cl. .......... 340/259, 356/200, 250/219 DF
[51] Int. Cl. .......... G01n 21/30
[50] Field of Search .......... 250/219 DF; 356/200; 340/259

[56] References Cited
UNITED STATES PATENTS
3,467,325 9/1969 Tretheway .......... 340/259 X

*Primary Examiner*—John W. Caldwell
*Assistant Examiner*—Michael Slobasky
*Attorneys*—Walter O. Hodsdon and Robert F. Cody

ABSTRACT: A web-scanning system is disclosed which is responsive to indicate the clustering of web defects. Digital words containing bits which correspond to defect signals in the respective portions of the web are applied serially to an accumulator in such a way that a bit causes the accumulator count to increase; and absence of a bit causes the accumulator count to decrease. Weighting the amount of increase to decrease has the effect of controlling the degree of clustering necessary to provide the aforesaid indication.

Figures 1, 3A, 3B:
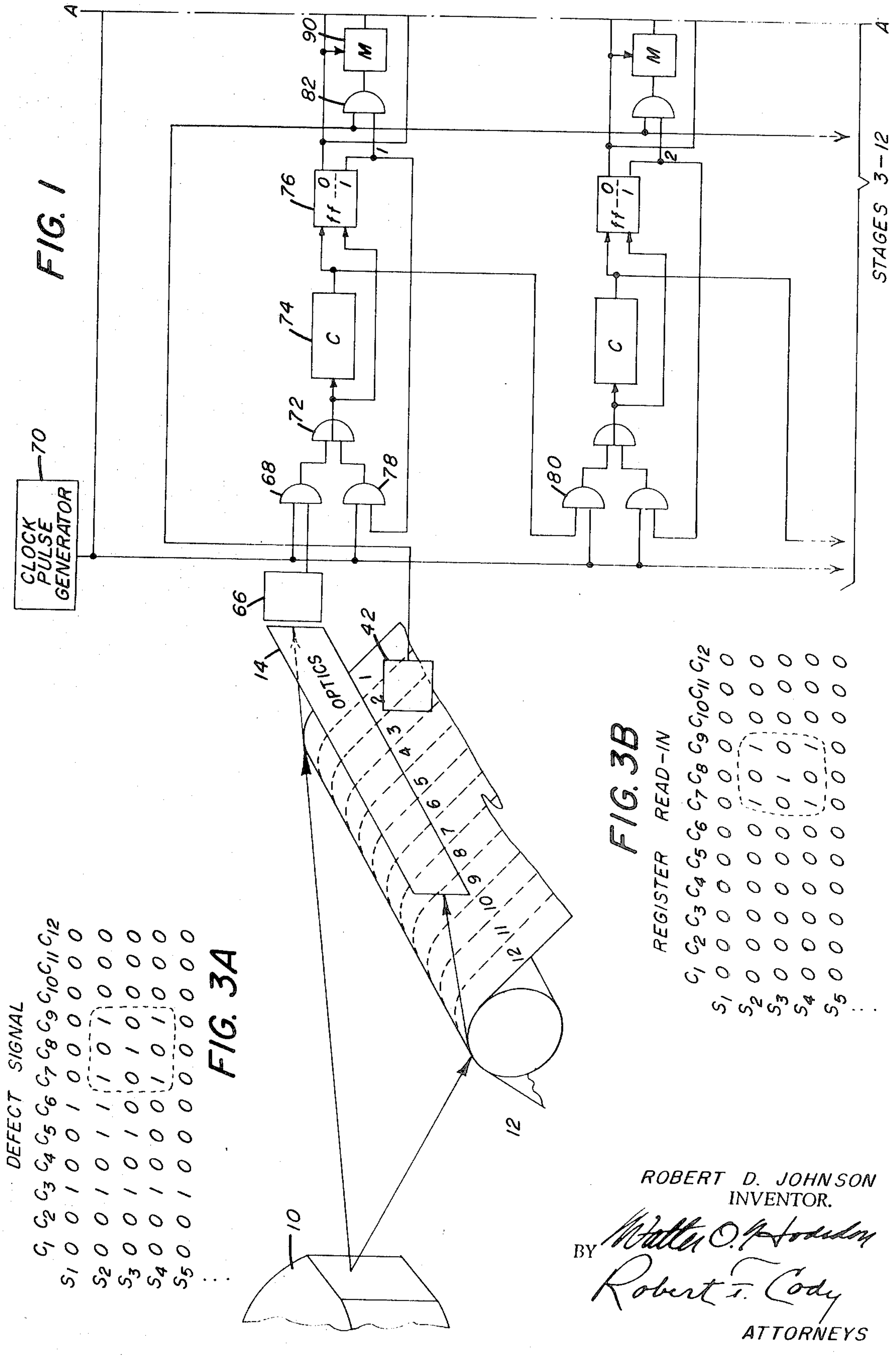

ROBERT D. JOHNSON
INVENTOR.

BY

ATTORNEYS

PATENTED NOV 2 1971

3,618,063

ROBERT D. JOHNSON
INVENTOR.

BY Walter O. Hodsdon
Robert F. Cody
ATTORNEYS

DEFECT INSPECTION APPARATUS

BACKGROUND OF THE INVENTION

11. Field of the Invention

This invention relates in general to apparatus for inspecting webs for defects therein; and in particular, the invention provides a system for registering when the concentration of scanned web defects is greater than a predetermined amount.

2. Description Relative to the Prior Art

Apparatus embodying the present invention is an improvement over the general circuit arrangements depicted in FIGS. 4 and 5 of copending U. S. Pat. application Ser. No. 812,107. U. S. Pat. application Ser. No. 812,107 is directed to a web inspection system in which the web in question is repeatedly scanned across the web. The web is indicated as having a number of widthwise sectors or channels (12, by way of example), and cooperative with each such channel is a respective circuit which registers a web defect whenever a predetermined number of successive sweeps of the web channel in question is productive of a defect signal. Those defect signals which do not combine with successive other defect signals to define and register a defect are, in the system of U. S. Pat. application Ser. No. 812,107, discarded.

The problem with the practice of discarding randomly occurring defect signals is that recognition is not made of the frequency at which such random signals occur: which is to say that tight clusters of small defects, none of which is large enough to get registered as a defect, may be just as objectionable from a product quality standpoint as a defect defined as indicated above.

U. S. Pat. No. 3,264,480 is relevant to the problem faced by the invention, but is distinguished over in that U. S. Pat. No. 3,264,480 is not concerned with defect clustering, whereas the present invention is so concerned.

SUMMARY OF THE INVENTION

The present invention provides for the registering of clusters of small defects, hereinafter sometimes referred to as "statistical defects"; and in its presently preferred form, the invention provides a way to define the degree of defect clustering, i.e. the density of small defects within a web which is necessary for registration of a statistical defect.

In implementing the concepts of the invention, digital computing techniques are employed. As with the system of U. S. Pat application Ser. No. 812,107, a predetermined number of successive defect signals (bits) produced by successively scanning a particular web channel are registered as a web defect, hereinafter sometimes referred to as a "defined defect". However, at the end of each web scanning, those isolated bits which have not combined with other bits to form defined defects are not discarded as with the system of U. S. Pat. application Ser. No. 812,107; but are, instead, accumulated on a continuous basis in such a way that the presence of an isolated bit in a given channel increases the accumulation, and the absence of an isolated bit in such channel decreases such accumulation. In the event that the accumulation exceeds a predetermined reference amount, an alarm or the like is actuated to indicate that a statistical defect has occurred.

To control the degree of defect clustering to which the system of the invention is responsive, the invention proposes that the ratio of the rates of accumulating up, and back down, be adjustable. Thus, for example, the presence of an isolated channel bit may cause the accumulator to count up by ten, whereas the absence of such a bit may cause the accumulator to count back down by only one: the greater the ratio of such rates, the less the amount of clustering which is necessary to indicate a statistical defect.

The invention will be described with reference to the figures, wherein

Figure 2:
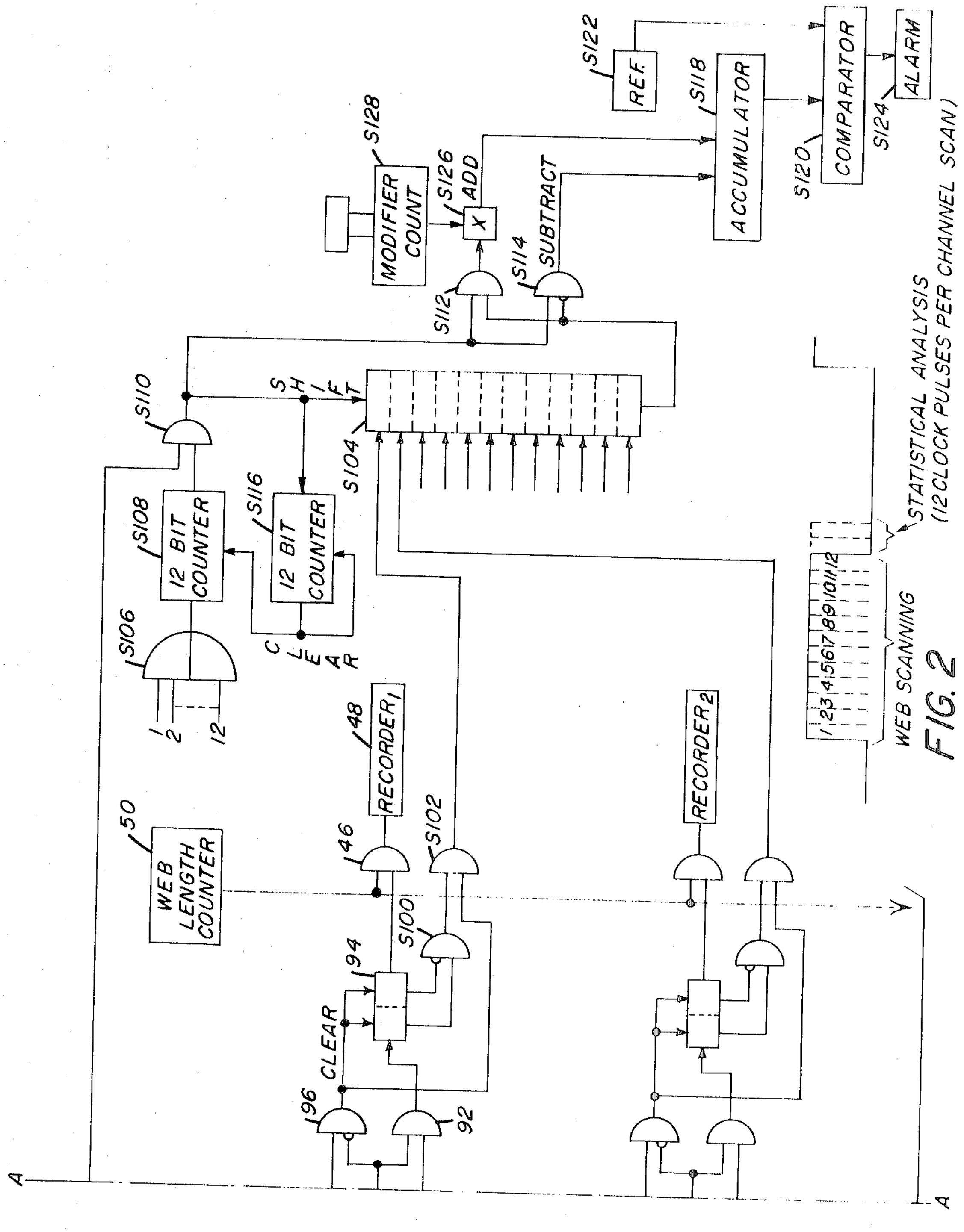

FIG. 1 is a logical block diagram illustrating a system for implementing the concepts of the invention, FIG. 2 is a timing diagram useful in describing the operation of the system of figure 1, and particularly indicates that web scanning as practiced in this form of the invention has a duty cycle of about fifty percent, and FIG. 3*a* and 3*b* are bit-matrices useful in illustrating the nature and detection of statistical defects.

Although the invention is cast, in Figure 1, in what appears as an assemblage of hardware parts, it should be borne in mind that emphasis has been placed on functions necessary to produce the results incident to use of the invention. Such functions, in whole or in part, may be obtained, typically, from a suitably programmed general purpose digital computer; or such functions may be obtained, for example, from a suitably wired assemblage of logical circuits, etc.

The invention is depicted in cooperation with a reflection type scanner system of the type indicated in copending U. S. Pat. application Ser. No. 12,083 to point up the fact that the invention is not restricted to cooperation with a transmittance-type scanner system as indicated in copending U. S. Pat. application Ser. No. 812,107. However, to emphasize and illustrate how and where the invention improves over the circuit arrangement indicated in U.S. Pat. application Ser. No. 812,107, the same character notations are employed herein as are employed for the corresponding parts of U.S. Pat. application Ser. No. 812,107; and parts exclusive to implementing the present invention are prefixed with the letter S (for statistical).

Reference should be had to Figure 1: A rotating multifaceted mirror 10 directs and sweeps a radiant beam across a web 12 in the manner indicated in copending U.S. Pat. application Ser. No. 12,083. The beam is so aimed at the web 12 that it reflects off the web surface to collecting optics 14; and irregularities in the web surface cause modulation of the light received by a photodetector 42, thus causing the photodetector 42 to produce discrete defect signals representative of such irregularities.

As the scanning beam begins its sweep across the web 12, it excites a photodetector 66 disposed at the edge of the web 12, thereby to initiate circuit channelization for processing defect signals: Excitation of the photodetector 66 causes a (first) pulse from a clock pulse generator 70 to be applied through an AND gate 68, and thence through an OR gate 72, to a counter 74 and to a flip-flop 76, setting such flip-flop to its ONE state. With the flip-flop 76 to set, an AND gate 78 is opened, allowing the clock pulse from the pulse generator 70 now to pour through the AND gate 78 to the counter 74. As contemplated in the circuit arrangement of FIG. 1 six clock pulses occur during the time that the beam sweeps a given web channel; and as soon as the counter 74 counts to six, it overflows, thereby resetting the flip-flop 76 to its ZERO state, and arming, via an AND gate 80, the channel circuit which is cooperative with the second web channel.

During the time that the first channel circuit is armed, i.e. while the flip-flop 76 is in its ONE state, any discrete defect signals which are sensed by the photodetector 42 are applied through an AND gate 82 to a memory device 90, e.g. a register; and, if a bit appears in the memory device 90 at the end of a channel scan, it is gated, via an AND gate 92, into a two-stage binary counter 94. In the event the memory device 90 does not store a bit at the conclusion of a channel scan, the counter 94 is cleared via an inhibit gate 96. Thus, it takes at least two successive bits (for two successive scans of the same web channel) into the memory device 90 in order for the second stage of the counter 94 to be set to its ONE state; and when the second stage of the counter 94 is set to its ONE state, a web defect is defined the location of such defined defect being recorded (48) via an AND gate 46 which is adapted to pass a web location count (50).

In the event a given channel scan is productive of a discrete defect signal, but neither the previous nor the next subsequent scan of that channel is productive of a discrete defect signal, then the first stage of the counter 94 will store a ONE, and the second stage of such counter will store a ZERO, at the conclusion of such next subsequent channel scan. Such being the case, a randomly occurring defect signal, i.e. the ONE in the first counter stage, has been identified and isolated, the location of which defect would, in the system of the prior art, not be recorded. In accordance with the invention, the isolated ONE in the counter is gated through logic, consisting of an inhibit gate S100 and an AND gate S102, to the first stage of a 12-stage shift register S104; and such gating occurs at the conclusion of the aforementioned next subsequent channel scan, i.e. when the inhibit gate 96 clears the counter 94.

In like manner, the second through the twelfth of the channel circuits apply ONE's, or ZERO's, to their respective stages of the shift register S104 depending on whether they have respectively identified discrete isolated ONE's or not; and attendantly, at the conclusion of each full scanning of the web, the register S104 is left storing a digital word having any number (up to 12) of ONE's.

As each channel scan is completed, i.e. when the flip-flop 76 is reset to its ZERO state, a pulse is applied through an OR gate S106 to a 12-bit counter S108. Thus, the counter S108 counts up to decimal 12 during each web scanning; and once the counter S108 has counted 12 pulses,, it actuates an AND gate S110 to allow clock pulses from the clock pulse generator 70 to be applied to shift the 12-bit digital word in the register S104 to logic consisting of AND and inhibit gates S112 and S114. See FIG. 2 for the requisite timing. A 12-bit counter S116 counts the 12 bits necessary to clear the register S104 and, when such counter has received its twelfth bit, it clears both itself and the counter S106, thereby readying the counter S108 for the next web scanning.

For each ONE which is in the statistical word read out of the register S104 and through the AND gate S112, the count in an accumulator S118 is increased; and for each ZERO in such statistical word which is gated through the inhibit gate S114, the count in the accumulator 118 is decreased. The count in the accumulator S118 is compared (S120) with a reference count (S122), and when the accumulated count is greater than the reference count—indicating that too many discrete web defects have occurred within a given area of the web—an alarm S124 or the like is actuated to indicate the occurrence of a statistical web defect.

In accordance with the invention in its presently preferred form, the density of discrete defects which must obtain in order to actuate the alarm S124 is controllable. To this end, the invention proposes that for each ONE, and for each ZERO, appearing at the inputs of the AND and inhibit gates S112 and S114, the count in the accumulator be increased (via multiplier S126 and adjustable modifier count S128) and decreased by respective amounts. For example, for each bit appearing in the statistical word output of the register S104 the count in the accumulator S118 will increase by, say, 10; for each ZERO in the statistical word, the accumulator count will decrease by, say, one. Thus, the greater the concentration of defects in a given area of the web, the greater the chance will be that the accumulator count will exceed the count of the reference S122, thereby to actuate the alarm S124. Decreasing the size of the modifier count (S128) has the effect of requiring a larger concentration (density) of discrete defects for alarm actuation; and increasing the size of the modifying count has the reverse effect.

FIG. 3*a* depicts the generation of discrete defect bits for web scans S1 through S5. To be noted is that the web channel C3 indicates a defined streak defect; that web channel C5 has a defined defect occurring at scans S2 and S3; and that web channel C6 has a defined defect occurring at Scans S1 and S2. Discrete defects are clustered in channels C7 through C9 and appear during web scans S2 through S4. In accordance with the teaching of copending U.S. Pat. application Ser. No. 812,107, a recorder 48 in circuit channel 2 continually stores the counts of the web length counter 50; and recorders 48 in the circuit channels 5 and 6 store the counts of the web length counter which correspond to the defined defects in web channels 5 and 6. In accordance with the present invention, however, and as appears in FIG. 3*b*, statistical words (evidencing the clustering of discrete defects) are logically produced and applied to the register S104; and depending on the magnitude of the count set into the count modifier (S128), such clustering may effect actuation of the alarm S124.

The invention has been described in detail with particular reference to preferred embodiments thereof, but it will be understood that variations and modifications can be effected within the spirit and scope of the invention.

What is claimed is:

1. Apparatus for detecting clusters of defects in a web comprising:

a. means for scanning the said web and producing, in time relationship with said scanning, a train of signals, each of which signals is representative of a defect in said web, b. accumulator means adapted to receive serially the aforesaid train of defect representative signals in the same time relationship in which thy occur, c. means cooperative with said accumulator means respectively for increasing the accumulation of said accumulator means for each signal applied to said accumulator means, and for decreasing the accumulation in proportion to the time spacing between signals applied to said accumulator means, d. means for producing a reference accumulation and for comparing said reference accumulation with said accumulation of said accumulator means, and e. means cooperative with both said means for producing a reference accumulation and with said accumulator means for producing an output signal when the accumulation of the accumulator means is greater than the said reference accumulation.

2. The apparatus of claim 1 including means for adjusting the relative amounts that the accumulation of said accumulator means is increased ad decreased for given defect signals and signal spacings.

3. In a web inspection system of the type including:

a. means for repeatedly scanning a web and, in response to discrete defects in said web, producing signals representative of such discrete defects, and b. means for receiving said signals and registering defects in response to sets of discrete signals representative of adjacent web defects, the improvement comprising:

a. accumulating means, b. means, cooperative with said means for receiving said signals and said accumulating means, for increasing and decreasing the accumulation of said accumulating means during each scan of said web respectively in response to discrete defect signals which do not occur in sets thereof, and in proportion to the spacings between said defect signals which do not occur in sets thereof, c. means for providing a reference accumulation, and d. means for comparing the said reference accumulation with the accumulation of said accumulating means and producing an output signal when the reference accumulation is the lesser of the two accumulations.

4. The system improvement of claim 3 including means, cooperative with said means for increasing and decreasing the accumulation of said accumulating means, for adjusting the relative amounts that the accumulation of said accumulating means is increased and decreased respectively in response to said discrete signals and said signal spacings.

5. The system of claim 3 wherein:

a. said means for scanning and producing signals is comprised of a plurality of signal-processing circuits each cooperative with a respective widthwise portion of said web, b. said means for receiving signals and registering defects is comprised of a plurality of signal-storing means, each cooperative with a respective signal-processing circuit, for producing a defined defect representative signal output in response to a predetermined number of input signals received thereby during a predetermined number of scannings of its respective web portion, each said signal-storing means including means for clearing itself when the said predetermined number of scannings of its respective web portion are unproductive of a defined defect representative signal, and c. said means cooperative with said means for receiving signals is comprised of respective means adapted to receive said signals cleared from said signal-storing means, said respective means adapted to receive said cleared signals being cooperative with said accumulating means to apply serially thereto said signals cleared from said signal-storing means.

6. The system of claim 6 including means cooperative with said accumulating means for increasing the amount of the accumulation of said accumulating means, for each signal applied serially to said accumulating means, by an amount different than the amount by which said accumulation is decreased in response to signal spacings.

7. The system of claim 5 (a) wherein said means for receiving signals cleared from said signal storing means is a shift register the respective stages of which are adapted to receive and store respective cleared signals corresponding to respective portions of the web, and (b) wherein said system includes means for so shifting the signals stored in said register into said accumulating means that as each stage registering a stored signal is cleared of its signal the accumulation of said accumulating means is increased, and as each register stage not storing a signal is cleared, the accumulation of said accumulating means is decreased.

8. The system of claim 7 including means for modifying the amounts that said accumulations are respectively and discretely increased and decreased.

* * * * *